P. G. LEISTNER.
GREASE CUP.
APPLICATION FILED FEB. 24, 1908.
912,693.
Patented Feb. 16, 1909.
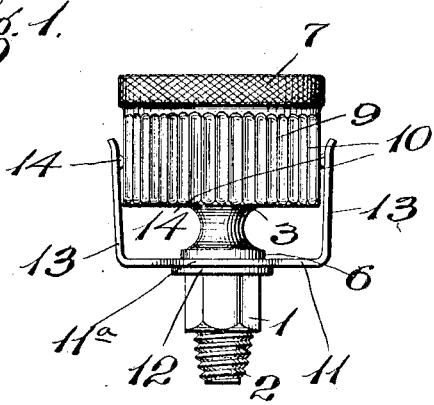
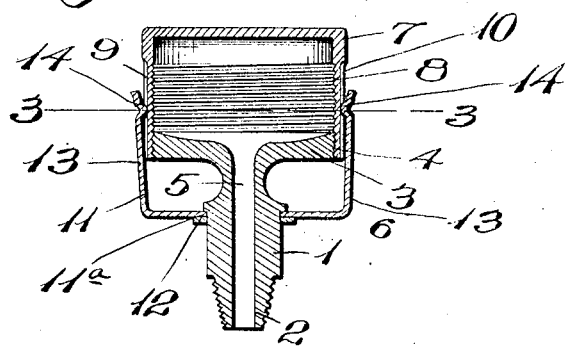
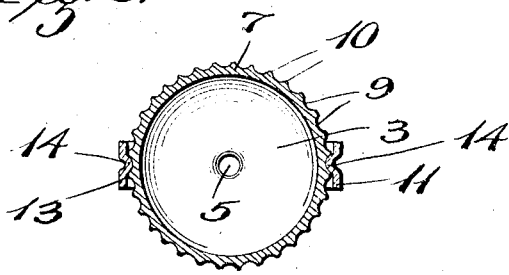
Attest.
E. M. Harrington
W. P. Smith
Inventor:
Paul G. Leistner
By Higdon Longan ATTYS

UNITED STATES PATENT OFFICE.

PAUL G. LEISTNER, OF ST. CHARLES, MISSOURI.

GREASE-CUP.

No. 912,693.

Specification of Letters Patent.

Patented Feb. 16, 1909.

Application filed February 24, 1908. Serial No. 417,437.

*To all whom it may concern:*

Be it known that I, PAUL G. LEISTNER, a citizen of the United States, and resident of St. Charles, Missouri, have invented certain new and useful Improvements in Grease-Cups, of which the following is a specification containing a full, clear, and exact description, reference being had to the accompanying drawings, forming a part hereof.

My invention relates to a grease cup, and the object of my invention is to construct a grease cup especially designed for automobiles, although it may be used on various devices wherever lubrication is required.

To the above purposes, my invention consists in certain novel features of construction and arrangement of parts which will be hereinafter more fully set forth, pointed out in the claims, and illustrated in the accompanying drawings, in which:

Figure 1 is a side elevation of my invention; Fig. 2 is a central vertical section; and Fig. 3 is a transverse section taken on the line 3—3 of Fig. 2.

Referring by numerals to the accompanying drawings: 1 indicates an angular stem, provided on its lower end with a series of screw threads 2, by means of which it may be attached to the parts of the automobile or other devices which are desired to be lubricated. Formed integral with the stem 1 is the bottom member of the cup 3, which is substantially saucer-shaped and the peripheral edge of which is provided with a series of screw threads 4. Formed in the member 3 and the stem 1 is a central opening 5, for the passage of the grease from the cup.

6 indicates a flange formed integral with the stem 1.

7 indicates the removable member, or cap, of the cup, which is internally screw threaded, as designated by 8, and adapted to be screwed onto and removed from the member 3. The exterior of said cap 7 has a projecting milled edge 8, by which it may be manipulated. The cap 7 is provided with a series of vertical parallel depressions or parallel grooves 9, between which are projecting parallel and vertical ribs or beads 10, the function of which will be hereinafter referred to.

11 indicates a substantially U-shaped clamping device to prevent the cap 7 from being accidently unscrewed or displaced from the member 3, by the vibration and jar to which the grease cup is subjected while in use. Said clamping device is provided with a portion 11ª, in which is formed an angular aperture, through which the angular stem 1 may be forced, or in construction the clamping device is forced onto this stem and against the shoulder 6; and to assist in holding the clamping device in place I employ a washer 12, which is also forced onto the stem 1 and against the clamping device. The said clamping device is provided with elastic arms 13, which arms are substantially parallel and are adapted to clamp or grip the cap 7 at points diametrically opposite to each other. Formed on the upper ends and on the inside of said arms 13 are projections 14, the said projections being rounded and adapted to fit into the grooves 9. In construction, the clamping device is stamped out of spring brass material, and the arms 13 bent as shown. The projections 14 are also stamped from the material composing the arms.

The clamping action of the arms 13 is sufficient to prevent the cap 7 from working unscrewed by vibration of the device to which the cup is applied, but it is not great enough to prevent the cup from being screwed up or down on the member 3 by hand.

The cup is intended to be used for a lubricant of a plastic or semi-plastic state, as distinguished from a liquid state.

Having fully described my invention, what I claim is:

A grease cup, comprising a tubular stem, a portion of the exterior of which is non-circular; a saucer-shaped member integral with the top of the stem, the edge of which member is screw-threaded, an interiorly screw-threaded cap adapted to be screw seated on the saucer-shaped member, there being a continuous series of vertically disposed grooves formed in the outer face of the cap, a plate fitted onto the non-circular portion of the tubular stem, a retaining washer located on said stem and bearing against the plate, a pair of oppositely arranged spring arms integral with the plate and extending upward on opposite sides of the cap; and projections formed on the ends of the spring arms, which projections engage in the grooves of the cap.

In testimony whereof, I have signed my name to this specification, in presence of two subscribing witnesses.

PAUL G. LEISTNER.

Witnesses:
M. P. SMITH,
E. L. WALLACE.